US009923597B2

(12) United States Patent
Gorokhov et al.

(10) Patent No.: US 9,923,597 B2
(45) Date of Patent: Mar. 20, 2018

(54) INTERFERENCE MITIGATION FOR DOWNLINK IN A WIRELESS COMMUNICATION SYSTEM

(71) Applicant: QUALCOMM Incorporated, San Diego, CA (US)

(72) Inventors: Alexei Y. Gorokhov, San Diego, CA (US); Avneesh Agrawal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/991,874

(22) Filed: Jan. 8, 2016

(65) Prior Publication Data

US 2016/0119022 A1 Apr. 28, 2016

Related U.S. Application Data

(63) Continuation of application No. 12/763,836, filed on Apr. 20, 2010, now Pat. No. 9,264,097.
(Continued)

(51) Int. Cl.
*H04B 1/7103* (2011.01)

(52) U.S. Cl.
CPC . *H04B 1/7103* (2013.01); *H04B 2201/70702* (2013.01)

(58) Field of Classification Search
CPC .............. H04B 1/7103; H04B 2201/70702
(Continued)

(56) References Cited

U.S. PATENT DOCUMENTS 6,782,037 B1 * 8/2004 Krishnamoorthy ... H04L 1/0003
375/138
8,149,760 B2   4/2012 So et al.
(Continued)

FOREIGN PATENT DOCUMENTS

CN         1283005 A    2/2001
CN       101035254 A    9/2007
(Continued)

OTHER PUBLICATIONS

International Search Report and Written Opinion—PCT/US2010/037533—ISA/EPO—dated Dec. 6, 2010.
(Continued)

*Primary Examiner* — Pao Sinkantarakorn
*Assistant Examiner* — Kabir Jahangir
(74) *Attorney, Agent, or Firm* — Harrity & Harrity, LLP

(57) ABSTRACT

Techniques for mitigating interference in a wireless communication system are described. In an aspect, pertinent transmission parameters for a served UE may be sent to at least one interfered UE to support interference mitigation. In one design, information for at least one transmission parameter for a data transmission sent by a first cell to a first UE may be transmitted to at least one UE served by a second cell to enable the at least one UE to perform interference mitigation for the data transmission sent by the first cell to the first UE. The information may be transmitted by either the first cell or the second cell. In another aspect, a cell may send transmission parameters for a UE via a pilot. In yet another aspect, scrambling may be performed by a cell at symbol level to enable an interfered UE to distinguish between modulation symbols of desired and interfering transmissions.

23 Claims, 6 Drawing Sheets

Related U.S. Application Data

(60) Provisional application No. 61/184,206, filed on Jun. 4, 2009, provisional application No. 61/184,670, filed on Jun. 5, 2009.

(58) Field of Classification Search
USPC .................................................. 370/310–350
See application file for complete search history.

(56) References Cited

U.S. PATENT DOCUMENTS

| | | | |
|---|---|---|---|
| 8,274,959 B2 | 9/2012 | Lee et al. | |
| 8,532,066 B2 | 9/2013 | Fernandez-Corbaton et al. | |
| 8,625,601 B2 | 1/2014 | Gholmieh et al. | |
| 8,781,400 B2 | 7/2014 | Lindoff et al. | |
| 9,374,719 B2 | 6/2016 | Xu et al. | |
| 9,426,673 B2 | 8/2016 | Chen et al. | |
| 9,628,214 B2 | 4/2017 | Luo et al. | |
| 9,723,497 B2 | 8/2017 | Xu et al. | |
| 2002/0027957 A1* | 3/2002 | Paulraj | H04B 7/0842 375/267 |
| 2002/0136187 A1 | 9/2002 | Aoyama et al. | |
| 2003/0012308 A1 | 1/2003 | Sampath et al. | |
| 2003/0123470 A1 | 7/2003 | Kim et al. | |
| 2003/0210782 A1 | 11/2003 | Dick et al. | |
| 2004/0181569 A1 | 9/2004 | Attar et al. | |
| 2005/0220211 A1* | 10/2005 | Shim | H04L 1/06 375/267 |
| 2006/0056501 A1 | 3/2006 | Kenichiro et al. | |
| 2007/0041404 A1 | 2/2007 | Palanki et al. | |
| 2007/0105592 A1 | 5/2007 | Kang et al. | |
| 2007/0183544 A1 | 8/2007 | Lee et al. | |
| 2008/0037409 A1 | 2/2008 | Ogawa et al. | |
| 2008/0045215 A1 | 2/2008 | Chen et al. | |
| 2008/0096557 A1 | 4/2008 | Rinne et al. | |
| 2008/0268856 A1* | 10/2008 | Francalanci | H04W 16/12 455/446 |
| 2009/0109939 A1 | 4/2009 | Bhushan et al. | |
| 2009/0175179 A1 | 7/2009 | Stewart et al. | |
| 2009/0233598 A1* | 9/2009 | Fukuoka | H04B 1/7107 455/434 |
| 2009/0264077 A1 | 10/2009 | Damnjanovic | |
| 2009/0279469 A1 | 11/2009 | Wang et al. | |
| 2009/0310715 A1* | 12/2009 | Cairns | H04L 1/0041 375/320 |
| 2010/0014660 A1 | 1/2010 | Kishiyama et al. | |
| 2010/0034314 A1 | 2/2010 | Brown et al. | |
| 2010/0069073 A1 | 3/2010 | Chen et al. | |
| 2010/0085913 A1 | 4/2010 | Subrahmanya | |
| 2010/0260052 A1 | 10/2010 | Cho et al. | |
| 2010/0296463 A1 | 11/2010 | Taoka et al. | |
| 2010/0309861 A1 | 12/2010 | Gorokhov et al. | |
| 2011/0080864 A1 | 4/2011 | Cai et al. | |
| 2011/0211555 A1 | 9/2011 | Cohn | |
| 2011/0255486 A1 | 10/2011 | Luo et al. | |
| 2012/0021738 A1 | 1/2012 | Koo et al. | |
| 2012/0082022 A1 | 4/2012 | Damnjanovic et al. | |
| 2012/0088539 A1 | 4/2012 | Jeong et al. | |
| 2012/0099434 A1 | 4/2012 | Sun et al. | |
| 2012/0099669 A1 | 4/2012 | Gorokhov et al. | |
| 2012/0122440 A1 | 5/2012 | Krishnamurthy et al. | |
| 2012/0207040 A1 | 8/2012 | Comsa et al. | |
| 2013/0033998 A1 | 2/2013 | Seo et al. | |
| 2013/0039268 A1 | 2/2013 | Blankenship et al. | |
| 2013/0044697 A1 | 2/2013 | Yoo et al. | |
| 2013/0084865 A1 | 4/2013 | Agrawal et al. | |
| 2013/0136095 A1 | 5/2013 | Nishio et al. | |
| 2013/0223409 A1 | 8/2013 | Jung et al. | |
| 2013/0286849 A1 | 10/2013 | Park | |
| 2013/0301467 A1 | 11/2013 | Kang et al. | |
| 2013/0301542 A1 | 11/2013 | Krishnamurthy et al. | |
| 2013/0301608 A1 | 11/2013 | Frenne et al. | |
| 2013/0303153 A1 | 11/2013 | Bontu et al. | |
| 2013/0308503 A1 | 11/2013 | Kim et al. | |
| 2013/0336193 A1 | 12/2013 | Luo et al. | |
| 2014/0016596 A1 | 1/2014 | Kim et al. | |
| 2014/0146767 A1 | 5/2014 | Choi et al. | |
| 2014/0204857 A1 | 7/2014 | Mallik et al. | |
| 2014/0219115 A1 | 8/2014 | Etemad et al. | |
| 2014/0226609 A1 | 8/2014 | Hooli et al. | |
| 2015/0092705 A1 | 4/2015 | Somasundaram | |
| 2015/0222304 A1 | 8/2015 | Xu et al. | |
| 2017/0163433 A1 | 6/2017 | Luo et al. | |

FOREIGN PATENT DOCUMENTS

| | | |
|---|---|---|
| CN | 101208881 A | 6/2008 |
| EP | 1881621 A1 | 1/2008 |
| JP | 2001509988 A | 7/2001 |
| JP | 2001339758 A | 12/2001 |
| JP | 2003174400 A | 6/2003 |
| JP | 2004511141 A | 4/2004 |
| JP | 2006141047 A | 6/2006 |
| JP | 2007300384 A | 11/2007 |
| JP | 2008092379 A | 4/2008 |
| JP | 2008193340 A | 8/2008 |
| JP | 2009501484 A | 1/2009 |
| JP | 2009505504 A | 2/2009 |
| JP | 2009089188 A | 4/2009 |
| JP | 2009100116 A | 5/2009 |
| JP | 2009111781 A | 5/2009 |
| JP | 2009542066 A | 11/2009 |
| JP | 2010501148 A | 1/2010 |
| JP | 2010506486 A | 2/2010 |
| JP | 2010532589 A | 10/2010 |
| JP | 2011501928 A | 1/2011 |
| JP | 2011527166 | 10/2011 |
| JP | 2012504894 A | 2/2012 |
| JP | 2013545396 A | 12/2013 |
| TW | 200718051 | 6/2006 |
| TW | 200742308 | 11/2007 |
| WO | 9834367 A1 | 8/1998 |
| WO | 03096694 A1 | 11/2003 |
| WO | 2004066547 A1 | 8/2004 |
| WO | 2007008036 A2 | 1/2007 |
| WO | 07019555 | 2/2007 |
| WO | 2007037008 A1 | 4/2007 |
| WO | 2007147810 A1 | 12/2007 |
| WO | 08022329 | 2/2008 |
| WO | 2008054141 A1 | 5/2008 |
| WO | 2008106317 A1 | 9/2008 |
| WO | 09052363 | 4/2009 |
| WO | 2010003034 A1 | 1/2010 |
| WO | 2010038999 A2 | 4/2010 |
| WO | 2010085268 | 7/2010 |
| WO | 2011057296 A2 | 5/2011 |
| WO | 2012006085 A1 | 1/2012 |
| WO | 2012032726 A1 | 3/2012 |
| WO | 2012060655 A2 | 5/2012 |

OTHER PUBLICATIONS

Klaus Kopsa et al: "Multiuser Space-Time Algorithms for Synchronization, Channel Estimation, and Data Detection in an Interference Monitoring System for UMTS/TDD Networks", IEEE Transactions on Communications, IEEE Service Center, Piscataway, NJ, US,vol. 55, No. 10,Oct. 1, 2007 (Oct. 1, 2007), pp. 1973-1983, XP011194612.

Partial International Search Report—PCT/US2010/037533—ISA/EPO—dated Sep. 23, 2010.

Taiwan Search Report—TW099118217—TIPO—dated Feb. 12, 2014.

Wu C-C et al: "Intercell interference cancellation for TD-CDMA mobile systems" Electronics Letters, IEE Stevenage, GB LNKD—DOI:10.1049/EL:20001381, vol. 36, No. 23, Nov. 9, 2000 (Nov. 9, 2000), pp. 1960-1961, XP006015935.

Kue P., et al., "Improved Multi-Cell Joint Channel Estimation for TD-SCDMA Downlink," Vehicular Technology Conference, 2008. VTC Spring 2008, IEEE, IEEE, Piscataway, NJ, USA, May 11, 2008. (May 11, 2008), pp. 1458-1462, XP031255807.

ETSI MCC: "Draft Report of 3GPP RAN Workshop on Release 12 and Onwards", 3GPP Draft; RWS-120XXX Draft

(56) References Cited

OTHER PUBLICATIONS

Report_RAN_REL12_Workshop_120507, 3rd Generation-Partnership Project (3GPP), Mobile Competence Centre; 650, Route Des Lucioles ; F-06921, Sophia-Antipolis Cedex ; France, no. Ljubljana, Slovenia; Jun. 11, 2012-Jun. 12, 2012, May 7, 2012 (May 7, 2012), XP050647939, [retrieved on May 7, 2012], pp. 11, 12.

Qualcomm Incorporated: "Resource Allocation Methods for NCT", 3GPP Draft; R1-122876 Resource Allocation Methods for NCT, 3rd Generation Partnership Project (3GPP), Mobile Competence Centre ; 650, Route Des Lucioles ; F-06921 Sophia-Antipolis Cedex ; France, vol. RAN WG1, no. Prague; May 21, 2012-May 25, 2012, May 16, 2012 (May 16, 2012), XP050601132, [retrieved on May 16, 2012].

IPWireless Inc: "Review of Approaches for Bandwidth Reduction for Low Complexity MTC LTE UES," 3GPP Draft; R1-114.267, 3rd Generation Partnership Project (3GPP), Mobile Competence Centre ; 650, Route Des Lucioles ; F-06921 Sophia-Antipolis Cedex ; France, vol. RAN WG1, no. San Francisco, USA; Nov. 14, 2011-Nov. 18, 2011, Nov. 9, 2011 (Nov. 9, 2011), 5 Pages, XP050562333, [retrieved on Nov. 9, 2011].

LG Electronics: "Discussions on Synchronized New Carrier Type", 3GPP TSG-RAN WG1#69, R1-122276, URL: http://www.3gpp.org/ftp/tsg_ran/WG1_RL1/TSGR1_69/Docs/R1-122276.zip, May 2012, pp. 1-4.

NEC Corporation: "Where to Improve Rel-12 and Beyond: Promising Technologies", 3GPP workshop Jun. 11, 2012_12_RAN_REL12, RWS-120011 , URL: http://www.3gpp.org/ftp/workshop/2012-06-11_12_RAN_REL12/Docs/RWS-120011.zip, Jun. 1, 2012, 5 Pages.

NTT DoCoMo: "Views on DL RSs for Unsynchronized New Carrier", 3GPP TSG-RAN WG1#68b, R1-121465, URL: http://www.3gpp.org/ftp/tsg_ran/WG1_RL1/TSGR1_68b/Docs/R1-121465.zip, Mar. 2012, pp. 1-5.

Qualcomm Incorporated: "Link Performance of DL Control Channels and PDSCH in Presence of CRS Interference", 3GPP Draft; R1-106382, 3rd Generation Partnership Project (3GPP), Mobile Competence Centre; 650, Route Des Lucioles; F-06921 Sophia-Antipolis Cedex; France, vol. RAN WG1, no. Jacksonville; Nov. 15, 2010-Nov. 19, 2010, Nov. 9, 2010, 6 Pages, XP050598889, [retrieved on Nov. 9, 2010].

\* cited by examiner

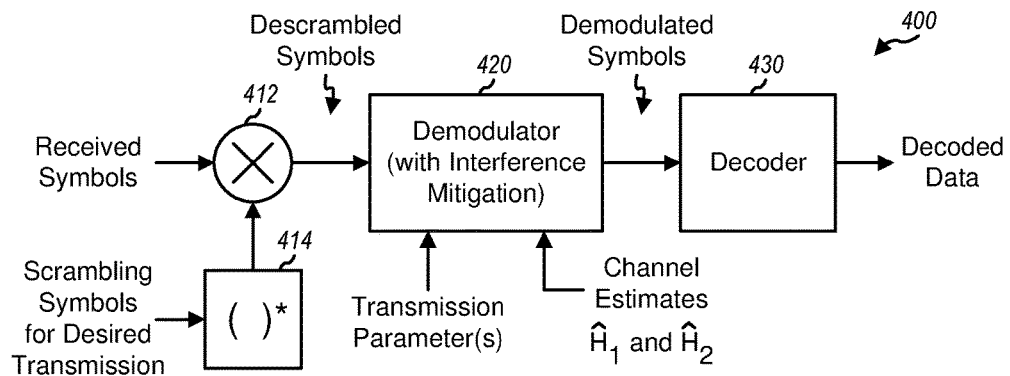
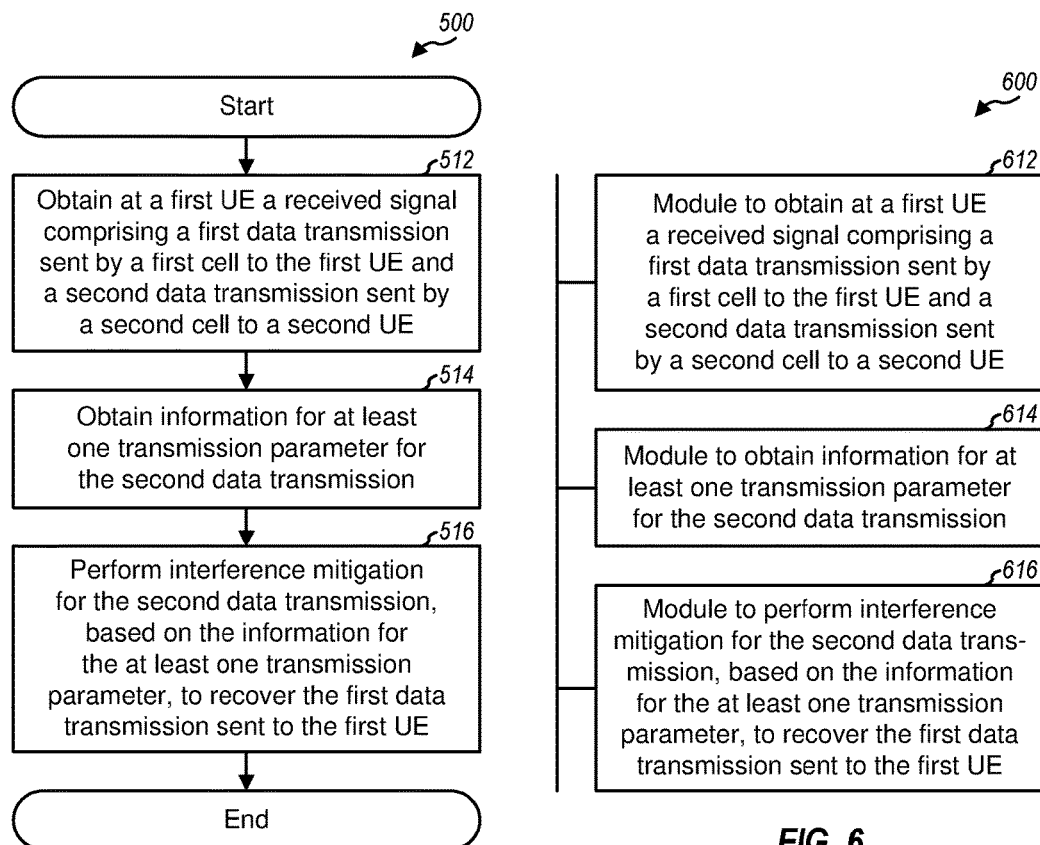

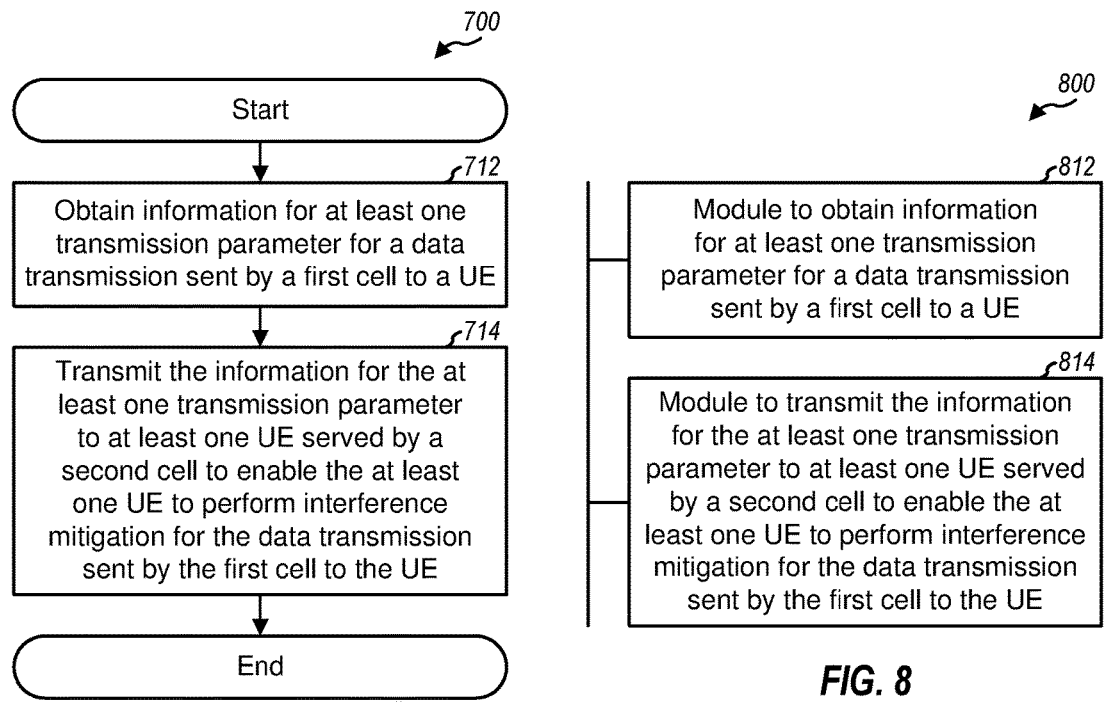
FIG. 7
FIG. 8
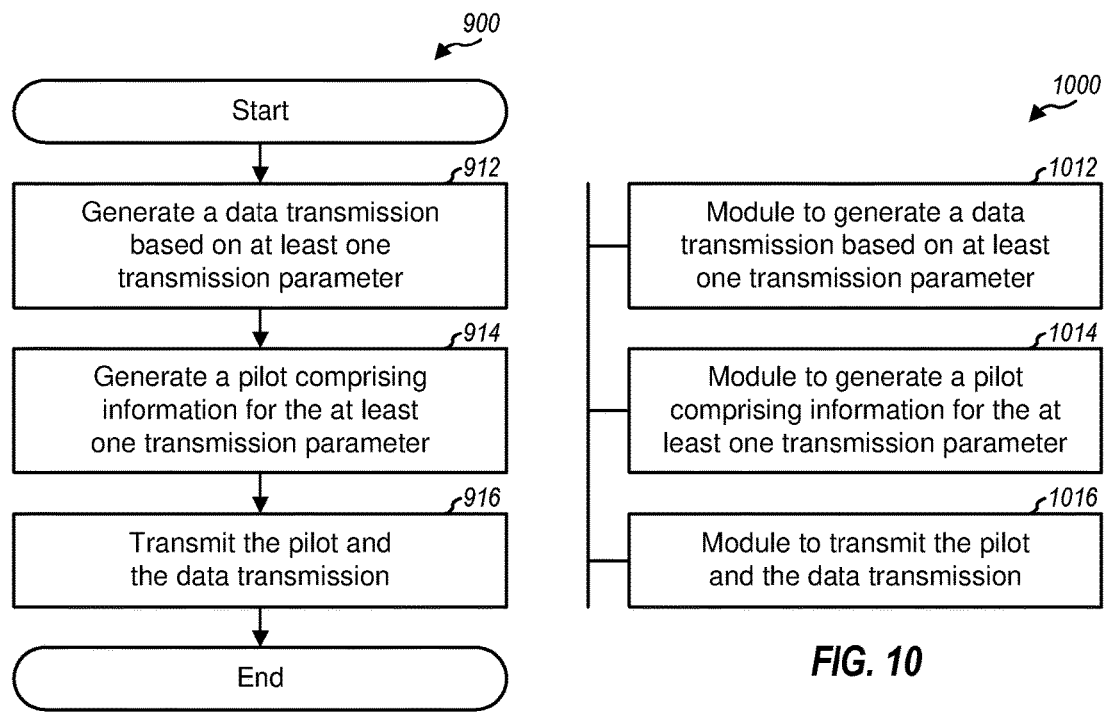
FIG. 9
FIG. 10

INTERFERENCE MITIGATION FOR DOWNLINK IN A WIRELESS COMMUNICATION SYSTEM

The present application is a continuation of U.S. application Ser. No. 12/763,836, entitled "INTERFERENCE MITIGATION FOR DOWNLINK IN A WIRELESS COMMUNICATION SYSTEM," filed Apr. 20, 2010, which claims priority to provisional U.S. Application Ser. No. 61/184,206, entitled "ENABLING DOWNLINK INTERFERENCE MITIGATION," filed Jun. 4, 2009, and Ser. No. 61/184,670, entitled "ENABLING DOWNLINK INTERFERENCE MITIGATION," filed Jun. 5, 2009, both assigned to the assignee hereof and incorporated herein by reference.

BACKGROUND

I. Field

The present disclosure relates generally to communication, and more specifically to techniques for mitigating interference in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A UE may communicate with a serving cell and may be within range of one or more neighbor cells. The term "cell" can refer to a coverage area of a base station and/or a base station subsystem serving the coverage area. The UE may receive a data transmission sent by the serving cell to the UE on the downlink. The UE may also receive other data transmissions sent by the neighbor cells to other UEs. These other data transmissions may appear as interference to the UE and may impact the ability of the UE to recover the data transmission from the serving cell. It may be desirable to mitigate the interference on the downlink in order to improve performance.

SUMMARY

Techniques for mitigating interference in a wireless communication system are described herein. In an aspect, pertinent transmission parameters for a served UE may be sent to at least one interfered UE to enable each interfered UE to perform interference mitigation. The transmission parameters may include a modulation order or modulation scheme, a traffic-to-pilot ratio (T2P), precoding information, a transmission rank, downlink resources, and/or other parameters for a data transmission to the served UE.

In one design, information for at least one transmission parameter for a data transmission sent by a first cell to a first UE may be obtained. The information for the at least one transmission parameter may be transmitted to at least one UE served by a second cell to enable the at least one UE to perform interference mitigation for the data transmission sent by the first cell to the first UE. The information may be obtained and transmitted by either the first cell or the second cell.

In one design, the first UE may obtain a received signal comprising a first data transmission sent by the first cell to the first UE and a second data transmission sent by the second cell to a second UE. The first UE may also obtain information for the at least one transmission parameter for the second data transmission, e.g., from the first cell or the second cell. The first UE may perform interference mitigation for the second data transmission based on the information for the at least one transmission parameter to recover the first data transmission sent to the first UE.

In another aspect, a cell may send transmission parameters for a UE via a pilot sent to the UE. In one design, the cell may generate a data transmission based on at least one transmission parameter. The cell may also generate a pilot (e.g., a dedicated pilot or a UE-specific reference signal) comprising information for the at least one transmission parameter. In one design, the cell may generate a pseudo-random number (PN) sequence based on the information for the at least one transmission parameter and may then generate modulation symbols for the pilot based on the PN sequence. The cell may transmit the pilot and the data transmission to a recipient UE. Other UEs may use the information for the at least one transmission parameter in the pilot to perform interference mitigation for the data transmission.

In yet another aspect, scrambling may be performed by a cell at symbol level to enable an interfered UE to distinguish between modulation symbols of a desired transmission and modulation symbols of an interfering transmission. In one design, a cell may generate modulation symbols for a data transmission for a recipient UE and may scramble the modulation symbols based on a scrambling sequence to obtain scrambled symbols. The cell may generate the scrambling sequence based on a cell identity (ID) and/or a UE ID. The cell may transmit the scrambled symbols for the data transmission. The recipient and interfered UEs may each perform descrambling with its scrambling sequence and may be able to distinguish between the modulation symbols of its data transmission and the modulation symbols of interfering transmissions, which may be useful for interference mitigation.

Various aspects and features of the disclosure are described in further detail below.

BRIEF DESCRIPTION OF THE DRAWINGS

FIG. 4 shows a receive processor that can perform symbol-level descrambling.

FIGS. 5 and 6 show a process and an apparatus, respectively, for performing interference mitigation.

FIGS. 7 and 8 show a process and an apparatus, respectively, for sending transmission parameters to support interference mitigation.

FIGS. 9 and 10 show a process and an apparatus, respectively, for sending transmission parameters via a pilot.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies.

Figure 1:
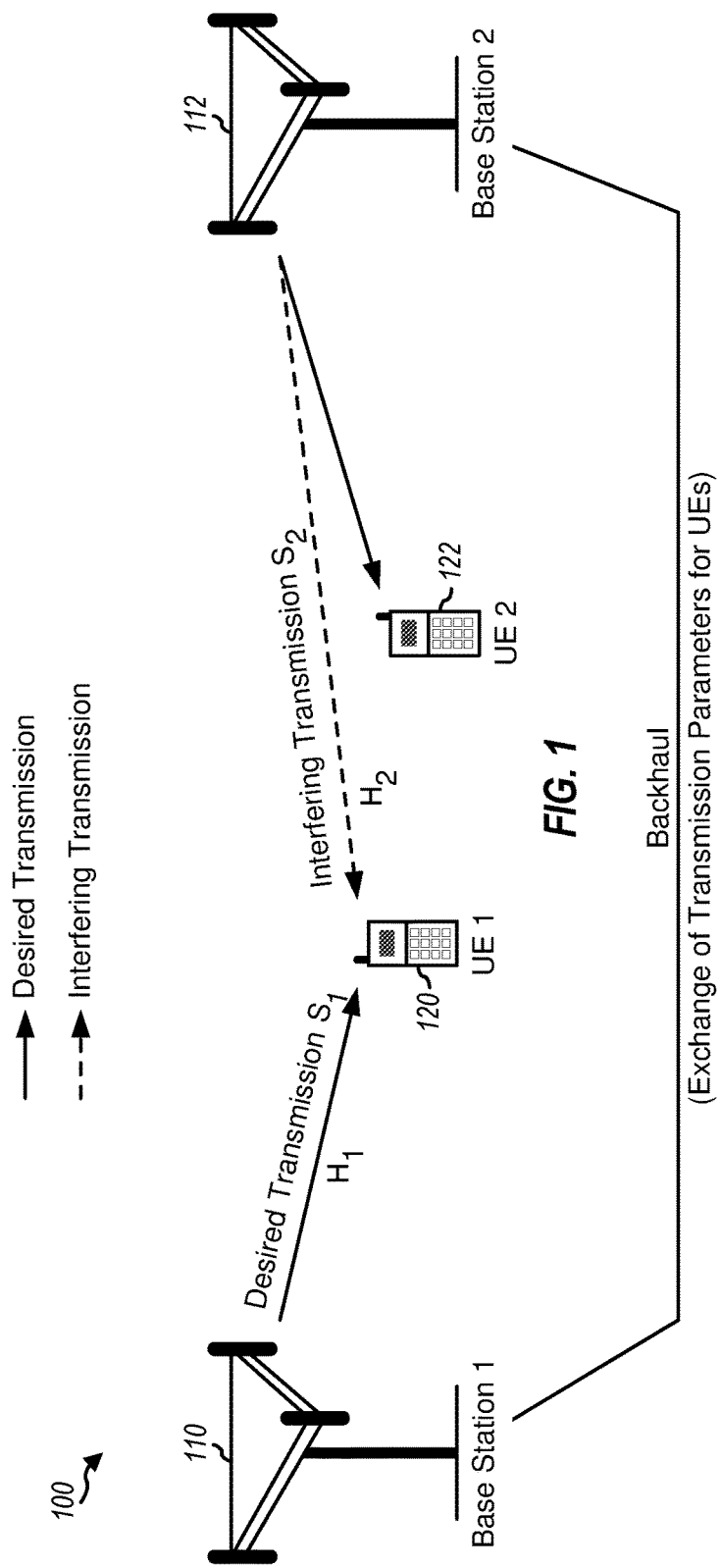
FIG. 1 shows a wireless communication system.

FIG. 1 shows a wireless communication system 100, which may be an LTE system, a CDMA system, etc. System 100 may include a number of base stations and other network entities. For simplicity, only two base stations 110 and 112 are shown in FIG. 1. A base station may be an entity that communicates with UEs and may also be referred to as a Node B, an evolved Node B (eNB), an access point, etc. Each base station may provide communication coverage for a particular geographic area. To improve system capacity, the overall coverage area of a base station may be partitioned into multiple (e.g., three) smaller areas. In 3GPP, the term "cell" can refer to the smallest coverage area of a base station and/or a base station subsystem serving this coverage area. The base stations may communicate with other network entities (e.g., other base stations and/or network controllers) via a backhaul.

A number of UEs may be dispersed throughout the system, and each UE may be stationary or mobile. For simplicity, only two UEs 120 and 122 are shown in FIG. 1. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc. A UE may communicate with a serving cell and may be within range of one or more neighbor cells. The UE may receive a desired transmission from the serving cell and may also receive interfering transmissions from the neighbor cells on the downlink.

In the description herein, the terms "cell" and "base station" may be used interchangeably. A serving cell is a cell or base station designated to serve a UE on the downlink. A neighbor cell is a cell or base station not serving a UE. The terms "transmission" and "signal" may be used interchangeably.

In FIG. 1, UE 120 may communicate with its serving cell 110, and UE 122 may communicate with its serving cell 112. UE 120 may receive a desired transmission from serving cell 110 as well as interfering transmissions from neighbor cell 112. The interfering transmissions may be intended for UE 122 and/or other UEs served by cell 112. UE 120 may thus be an interfered UE for the transmissions from cell 112 to UE 122 and other UEs. In general, UE 120 may receive any number of interfering transmissions from any number of neighbor cells. For simplicity, much of the description below assumes the example shown in FIG. 1, with one interfering transmission from one neighbor cell 112 to one UE 122.

Interference mitigation may be performed by a UE to mitigate interference on the downlink from neighbor cells. Interference mitigation refers to a process to address (e.g., suppress) interference in a received signal in order to improve the likelihood of recovering a desired transmission in the received signal. Interference mitigation may be accomplished via interference cancellation. Interference mitigation deals with interference that is present in a received signal whereas interference avoidance attempts to completely avoid interference, e.g., by sending transmissions on different frequency regions and/or in different time intervals. Interference mitigation may be used to improve system capacity, extend coverage, and/or improve data transmission performance of UEs that are exposed to strong interfering cells.

Interference mitigation may be categorized into two main classes:

Packet-level interference mitigation—mitigate interference by exploiting the code structure of an interfering transmission, and Symbol-level interference mitigation—mitigate interference based on knowledge or assumption of a modulation order of an interfering transmission.

An example of packet-level interference mitigation is post-decoding interference cancellation, which may be performed as follows. UE 120 may obtain a received signal comprising a desired transmission from serving cell 110 and an interfering transmission from neighbor cell 112, which may be intended for UE 122. UE 110 may process the received signal and decode the interfering transmission in the received signal. If the interfering transmission is decoded successfully, then UE 120 may estimate the interference due to the interfering transmission based on the decoded data and may then subtract the estimated interference from the received signal to obtain an interference-canceled signal having a higher signal-to-noise-and-interference ratio (SINR). UE 120 may then process the interference-canceled signal and decode the desired transmission. Data transmission performance may improve (e.g., a higher data rate may be supported) by the higher SINR obtained with interference cancellation.

Post-decoding interference cancellation may be supported if UE 120 can obtain pertinent transmission parameters to receive and decode the interfering transmission. These parameters may include a modulation and coding scheme (MCS) used for the interfering transmission, downlink resources (e.g., resource blocks) on which the interfering transmission is sent, etc. Neighbor cell 112 may send control information (e.g., a downlink grant) comprising these parameters to UE 122. Neighbor cell 112 may send the downlink grant with power control and/or rate control so that the downlink grant can be reliably received by intended UE 122. Hence, UE 120 may not be able to decode the downlink grant sent to UE 122 with power and/or rate control.

Furthermore, even if UE 120 can obtain the pertinent transmission parameters for the interfering transmission, UE 120 may be unable to successfully decode the interfering transmission. The MCS for the interfering transmission may be selected based on the channel quality between neighbor cell 112 and UE 122. The channel quality between neighbor cell 112 to its UE 122 will likely be better than the channel quality between neighbor cell 112 and UE 120. This may be due to the fact that each UE typically associates with the strongest cell, which may be serving cell 110 for UE 120. Consequently, UE 120 may receive the interfering transmission from neighbor cell 112 with a lower SINR than the required SINR for the MCS used for the interfering transmission.

Symbol-level interference mitigation may be performed when packet-level interference mitigation is not practical or when lower complexity is desired. Symbol-level interference mitigation does not require UE 120 to correctly decode an interfering transmission. Instead, UE 120 may demodulate the interfering transmission and may estimate and cancel the interference due to the modulation symbols. Symbol-level interference mitigation may be categorized into two main classes:

Soft-symbol interference cancellation—modulation symbols of an interfering transmission are estimated and subtracted from a received signal to improve SINR, and Joint demodulation—modulation symbols of an interfering transmission and a desired transmission are jointly demodulated, which may lead to calculation of "soft bits" or log-likelihood ratios (LLRs) of the desired transmission to be applied to a decoder for the desired transmission.

Soft-symbol interference cancellation or joint demodulation may also be performed iteratively with decoding. In this case, demodulation with soft-symbol interference cancellation or joint demodulation may be performed on received symbol to obtain demodulated symbols, then decoding may be performed on the demodulated symbols to obtain decoder output, and the processing may be repeated one or more times with the output of the demodulation step being provided to the decoding step, and vice versa. The demodulation step may thus alternate with the decoding step to obtain better estimates of modulation symbols of the desired transmission In an aspect, pertinent transmission parameters for a data transmission for a served UE may be sent to at least one interfered UE to enable each interfered UE to perform interference mitigation. Symbol-level interference mitigation may be supported by providing the interfered UE(s) with pertinent transmission parameters to demodulate an interfering transmission and to estimate interference due to these modulation symbols. These parameters may include one or more of the following:

Modulation order/modulation scheme used for the interfering transmission,

T2P of the interfering transmission,

Precoding information for the interfering transmission,

Transmission rank of the interfering transmission,

Downlink resources used for the interfering transmission, and/or

Other transmission parameters.

UE 120 may demodulate the interfering transmission based on the modulation order used for the interfering transmission. This modulation order may be selected from a set of modulation orders supported by the system. The supported modulation orders may include binary phase shift keying (BPSK), quadrature phase shift keying (QPSK), 16-level quadrature amplitude modulation (16-QAM), 64-QAM, etc. In one design, UE 120 may obtain the modulation order (rather than the MCS) of the interfering transmission as described below and may perform demodulation based on the modulation order. In another design, UE 120 may assume a particular modulation order (e.g., QPSK) for the interfering transmission and may perform demodulation based on the assumed modulation order. UE 120 may achieve maximum gain when the actual modulation order matches the assumed modulation order and may obtain substantial gain even when the actual modulation order (e.g., 16-QAM or 64-QAM) does not match the assumed modulation order (e.g., QPSK). In yet another design, UE 120 may perform demodulation based on multiple hypotheses for modulation order and may select a hypothesis associated with the highest likelihood of correct demodulation. The best hypothesis may be identified based on one or more metrics computed for each hypothesis, such as absolute values of LLRs in the case of joint demodulation, post-cancellation SINR in the case of demodulation with interference cancellation, etc.

UE 120 may estimate the wireless channel from neighbor cell 112 to UE 120 and may use the channel estimate to perform interference mitigation. UE 120 may perform channel estimation in different manners depending on how a reference signal (or pilot) and data are transmitted by neighbor cell 112. UE 120 may use the T2P and the precoding information for the interfering transmission to derive the channel estimate, as described below. The precoding information may convey weights used for precoding by neighbor cell 112 for UE 122. The precoding information may comprise a precoding matrix indicator (PMI), a transmission mode indicator, etc. The PMI may indicate a specific vector of weights used for precoding. The RI may indicate the number of data streams or packets to transmit. The transmission mode indicator may indicate whether closed-loop precoding or open-loop precoding, such as large delay cyclic delay diversity (LD-CDD) in LTE, is used. Closed-loop precoding or open-loop precoding may be performed based on specified precoding weights.

UE 120 may demodulate the interfering transmission based further on the transmission rank of the interfering transmission. The transmission rank may indicate the number of data streams transmitted by neighbor cell 112 to UE 122. UE 120 may also demodulate the interfering transmission based on the downlink resources used for the interfering transmission.

The received signal at UE 120 may be expressed as:

$$X(k)=H_1 \cdot S_1(k)+H_2 \cdot S_2(k)+N, \quad \text{Eq (1)}$$

where $S_1(k)$ is a desired transmission from serving cell 110 to UE 120, $S_2(k)$ is an interfering transmission from neighbor cell 112, $H_1$ is a channel gain from serving cell 110 to UE 120, $H_2$ is a channel gain from neighbor cell 112 to UE 120, $X(k)$ is the received signal at UE 120, and $N$ is additive noise at UE 120.

In equation (1), k may be an index for downlink resources used to send the desired and interfering transmissions. For simplicity, equation (1) assumes a flat fading channel with a constant channel gain for all downlink resources. The channel gain may also be a function of resource index k. Also for simplicity, equation (1) assumes only one interfering transmission from one neighbor cell.

UE 120 may perform minimum mean square error (MMSE) demodulation on the received signal by treating the interfering transmission as interference, as follows:

$$\hat{S}_1(k) = \frac{X(k) \cdot \hat{H}_1^*}{|\hat{H}_1|^2 + \sigma_{n1}^2}, \quad \text{Eq (2)}$$

where $\hat{H}_1$ is an estimate of the channel gain from serving cell 110 to UE 120, $\hat{S}_1(k)$ is an estimate of the desired transmission, $\sigma_{n1}^2$ is a variance of total noise and interference for the desired transmission, which is $H_2 \cdot S_2(k) + N$, and "*" denotes a complex conjugate.

For simplicity, equation (2) assumes one receive antenna at UE 120. Multiple-input multiple-output (MIMO) detection based on MMSE may also be performed if UE 120 is equipped with multiple receive antennas. Since the interfering transmission is treated as interference in equation (2), UE 120 may obtain a lower SINR for the desired transmission.

In one design, UE 120 may perform soft-symbol interference cancellation to improve performance. For soft-symbol interference cancellation, UE 120 may first perform demodulation to obtain an estimate of the interfering transmission based on the following criterion:

$$\hat{S}_2(k) = E\{S_2(k) | X(k), \hat{H}_1, \hat{H}_2, \sigma_n^2, Q_2\}, \quad \text{Eq (3)}$$

where $\hat{H}_2$ is an estimate of the channel gain from neighbor cell 112 to UE 120, $\hat{S}_2(k)$ is an estimate of the interfering transmission, and $Q_2$ denotes a modulation order of the interfering transmission assumed by UE 120, $\sigma_n^2$ is a variance of additive noise N in equation (1), and $E\{U|V\}$ denotes an expected value of U when V is observed.

As shown in equation (3), UE 120 may obtain an estimate $\hat{S}_2(k)$ of the interfering transmission based on the received signal X(k), the channel estimates $\hat{H}_1$ and $\hat{H}_2$, the noise variance $\sigma_n^2$, and the modulation order $Q_2$ of the interfering transmission.

UE 120 may then estimate and subtract the interference due to the interfering transmission from the received signal, as follows:

$$Y(k) = X(k) - \hat{H}_2 \cdot \hat{S}_2(k) = H_1 \cdot S_1(k) + N_r, \quad \text{Eq (4)}$$

where $\hat{H}_2 \cdot \hat{S}_2(k)$ is estimated interference due to the interfering transmission, Y(k) is an interference-canceled signal, and $N_r$ is residual noise and interference for the desired transmission.

UE 120 may then perform demodulation on the interference-canceled signal, as follows:

$$\hat{S}_1(k) = \frac{Y(k) \cdot \hat{H}_1^*}{|\hat{H}_1|^2 + \sigma_{nr}^2}, \quad \text{Eq (5)}$$

where $\sigma_{nr}^2$ is a variance of $N_r$.

Since the interfering transmission is removed in the interference-canceled signal, UE 120 may obtain a higher SINR for the desired transmission due to soft-symbol interference cancellation. UE 120 may further process (e.g., decode) the demodulated symbols for the desired transmission to recover data sent by serving cell 110 to UE 120.

In another design, UE 120 may perform joint demodulation to improve performance. UE 120 may estimate the wireless channels for serving cell 110 and neighbor cell 112. UE 120 may then perform joint demodulation based on maximum a posteriori probability (MAP) criterion, which may be equivalent to minimizing a distance metric in some cases. The MAP criterion may be expressed as follows:

$$M(\hat{S}_1(k), \hat{S}_2(k)) = -\frac{\|X(k) - \hat{H}_1 \cdot \hat{S}_1(k) - \hat{H}_2 \cdot \hat{S}_2(k)\|^2}{\sigma_n^2}, \quad \text{Eq (6)}$$

where $M(\hat{S}_1(k), \hat{S}_2(k))$ denotes a log-likelihood associated with a particular value of each code bit used to generate modulation symbols in desired transmission $S_1(k)$ and interfering transmission $S_2(k)$. An LLR of a given code bit b used to generate the desired transmission $S_1(k)$ may be expressed as follows:

$$LLR_b = \max_{\hat{S}_1(k), \hat{S}_2(k): b=0} M(\hat{S}_1(k), \hat{S}_2(k)) - \max_{\hat{S}_1(k), \hat{S}_2(k): b=1} M(\hat{S}_1(k), \hat{S}_2(k)), \quad \text{Eq (7)}$$

where $LLR_b$ is the LLR of code bit b.

UE 120 may perform joint demodulation based on maximum likelihood (ML) estimation or some other technique known in the art. UE 120 may perform joint demodulation with (i) channel estimates $\hat{H}_1$ and $\hat{H}_2$ for the serving and neighbor cells, respectively, (ii) a known modulation order of the desired transmission, and (iii) a known or assumed modulation order of the interfering transmission. UE 120 may obtain demodulated symbols $\hat{S}_1(k)$ and $\hat{S}_2(k)$ for both the desired and interfering transmissions from the joint demodulation. UE 120 may discard the demodulated symbols for the interfering transmission and may process (e.g., decode) the demodulated symbols for the desired transmission to recover the data sent by serving cell 110 to UE 120.

Regardless of the interference mitigation technique selected for use, UE 120 may need to estimate the wireless channel from neighbor cell 112 to UE 120 in order to perform interference mitigation. UE 120 may perform channel estimation in different manners depending on how the reference signal (or pilot) is transmitted.

In one design, a cell may transmit a common pilot to all UEs. The common pilot may also be referred to as a cell-specific reference signal (CRS), etc. The cell may transmit the common pilot from each antenna at the cell without any precoding. The cell may transmit data to a UE with or without precoding and at a suitable transmit power level. The transmit power level for data may be specified relative to the transmit power level for pilot and may be given by a T2P value.

UE 120 may estimate the channel gain for each antenna of each cell of interest based on the common pilot transmitted from that cell on that antenna. UE 120 may then obtain a channel estimate for each cell m, as follows:

$$H_m = G_{m1} \cdot W_{m1} \sqrt{P_m} + \ldots + G_{mN} \cdot W_{mN} \sqrt{P_m}. \qquad \text{Eq (8)}$$

where $G_{m1}$ through $G_{mN}$ are channel gains for N antennas at cell m, where $N \geq 1$, $W_{m1}$ through $W_{nN}$ are precoding weights for the N antennas at cell m, $P_m$ is a power gain determined by the T2P of the interfering transmission, and $H_m$ is the channel gain from cell m to UE 120.

As shown in equation (8), the actual channel observed by a data transmission from cell m may depend on precoding weights for the N antennas at cell m and the T2P used for the data transmission. Cell 112 may send the precoding weights and T2P directly or indirectly to recipient UE 122. For example, cell 112 may send PMI identifying the precoding weights in a downlink grant and may send the T2P via upper layer signaling to UE 122. Cell 112 may also send the precoding weights indirectly via a selected transmission mode, such as LD-CDD in LTE. UE 122 may be able to determine the precoding weight based on the direct or indirect signaling from cell 112. UE 122 may then reconstruct the actual channel based on estimated channel gains for the N antennas of cell 112 and the transmission parameters (e.g., the PMI and/or T2P) signaled to UE 122. These parameters may be made available to interfered UE 120 served by a different cell 110, so that UE 120 can perform interference mitigation.

In another design, a cell may transmit a dedicated pilot to a specific UE being served. The dedicated pilot may also be referred to as a dedicated reference signal (DRS), a UE-specific reference signal (UE-RS), etc. The cell may transmit the dedicated pilot on some of the downlink resources used for data transmission and may process (e.g., precode) the dedicated pilot in similar manner as for the data transmission. The dedicated pilot would then observe the same overall channel as the data transmission. The recipient UE may obtain a channel estimate for the cell based on the dedicated pilot, without having to know the processing (e.g., precoding and power scaling) performed by the cell for the dedicated pilot and the data transmission. Similarly, an interfered UE may also obtain a channel estimate for the cell based on the dedicated pilot transmitted by the cell.

As noted above, pertinent transmission parameters for a served UE may be sent to an interfered UE to enable to the interfered UE to perform interference mitigation. These parameters may include any of the parameters described above, e.g., the modulation order, MCS, T2P, precoding information, transmission rank, downlink resources, etc. These parameters may be sent in various manners.

In one design, a given cell m may send transmission parameters for other UEs served by neighbor cells to UEs served by cell m. Cell m may send transmission parameters for its UEs to the neighbor cells (e.g., via the backhaul, as shown in FIG. 1). Cell m may also receive transmission parameters for other UEs served by the neighbor cells, e.g., via the backhaul. Cell m and the neighbor cells may exchange transmission parameters for certain UEs (e.g., UEs located near the edge of coverage) instead of all UEs. The cell-edge UEs may be identified based on the locations of the UEs served by these cells and/or pilot measurements made by the UEs. Cell m may send the transmission parameters for the other UEs to its UEs, e.g., via broadcast signaling to all UEs, or unicast signaling to specific UEs, or multicast signaling to groups of UEs. A UE served by cell m may receive transmission parameters for one or more other UEs served by the neighbor cells and may perform interference mitigation based on the transmission parameters. This design may allow each cell to reliably send transmission parameters for other UEs in neighbor cells to the UEs served by that cell using existing signaling scheme.

In another design, a given cell m may send transmission parameters for its UEs to other UEs by neighbor cells. Cell m may send these transmission parameters via broadcast, unicast, or multicast signaling at a sufficiently high transmit power level to enable other UEs in the neighbor cells to reliably receive the transmission parameters. A UE served by cell m may receive signaling comprising transmission parameters for one or more other UEs served by one or more neighbor cells. The UE may perform interference mitigation based on the transmission parameters. This design may allow each cell to send transmission parameters for its UEs to other UEs in neighbor cells without having to exchange the parameters via the backhaul.

In general, transmission parameters for a given UE z may be sent by a serving cell, a neighbor cell, and/or some other entity to one or more interfered UEs. In one design, the sent transmission parameters may be actual parameters that are actually used for UE z. This design may allow the interfered UEs to demodulate the data transmission to UE z. In another design, the sent transmission parameters may be default parameters that are likely to be used for UE z. For example, the system may support QPSK, 16-QAM and 64-QAM, and the sent transmission parameters may convey a default modulation order of QPSK. In this case, the modulation order used for UE z may likely be QPSK but may also be 16-QAM or 64-QAM. In this design, the interfered UEs may perform demodulation based on the default modulation order. The interfered UEs may obtain the maximum gain when the actual modulation order is QPSK and may obtain substantial gain even when the actual modulation order is 16-QAM or 64-QAM. A cell may send different default values of a given transmission parameter for different sets of resources (e.g., different sets of frequency subbands, different subframes, or different sets of time frequency blocks) that may be used for data transmission. The cell may use the default parameter values for each set of resources, to the extent possible, in order to improve interference mitigation performance by the interfered UEs.

In another aspect, a cell may send transmission parameters for a UE via a dedicated pilot sent to the UE. The cell may generate the dedicated pilot based on a PN sequence, or a scrambling sequence, or a constant amplitude zero auto correlation (CAZAC) sequence, or some other sequence. For clarity, the following description assumes the use of a PN sequence. The cell may encode or scramble the dedicated pilot based on the transmission parameters, e.g., by generating the PN sequence based on these parameters.

Figure 2:
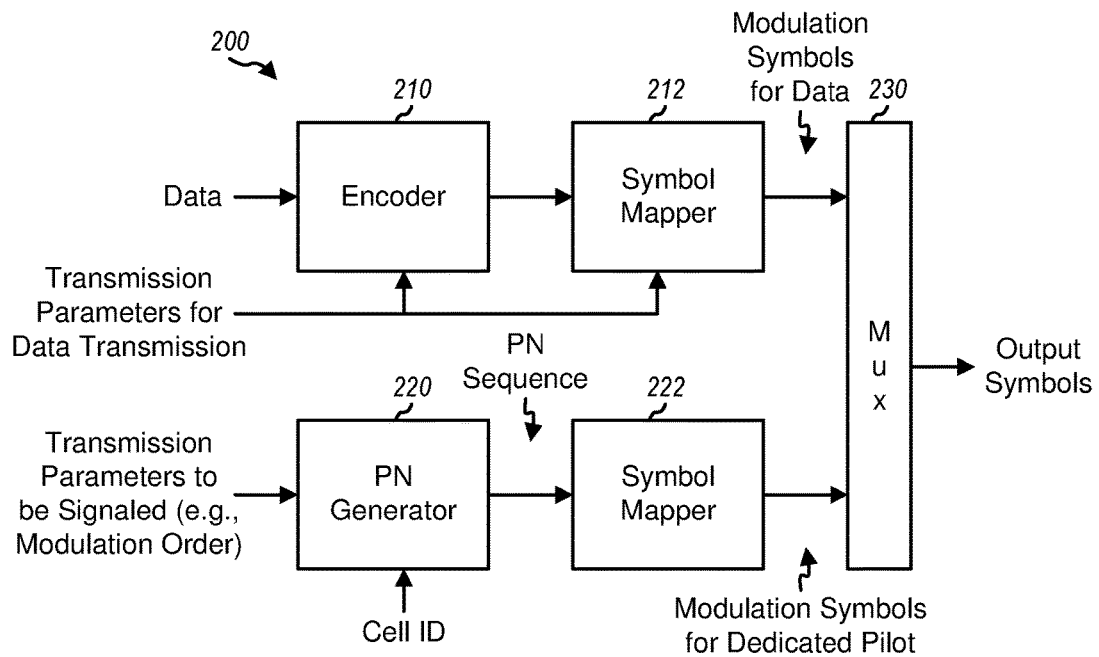
FIG. 2 shows a transmit processor that can generate a dedicated pilot carrying transmission parameters for data transmission for a UE.

FIG. 2 shows a block diagram of a design of a transmit processor 200 that can generate a dedicated pilot carrying transmission parameters for data transmission for a UE. Transmit processor 200 may be part of a base station/cell. Within transmit processor 200, an encoder 210 may receive data for the UE being served, encode the data based on a selected coding scheme or code rate, and provide coded data. A symbol mapper 212 may map the coded data to modulation symbols based on a selected modulation order. The modulation symbols for data may be referred to as data symbols.

A PN generator 220 may receive a set of parameters for the UE being served and may generate a PN sequence based on this parameter set. The parameter set may include a cell ID of the cell transmitting the data and dedicated pilot, one or more transmission parameters for the data transmission, and/or other parameters. The transmission parameters for the data transmission may include the selected modulation order for the data transmission and/or any of the parameters described above. In one design, PN generator 220 may generate a seed value based on the parameter set and may initialize a linear feedback shift register (LFSR) based on the seed value. The LFSR may then generate the PN sequence based on a particular polynomial generator. A symbol mapper 222 may map the bits in the PN sequence to modulation symbols based on a modulation order used for the dedicated pilot, which may be different from the modulation order used for data transmission. The modulation symbols for the pilot may be referred to as pilot symbols.

A multiplexer (Mux) 230 may receive the data symbols from symbol mapper 212 and the pilot symbols from symbol mapper 222. Multiplexer 230 may provide the data symbols to resources used for data transmission and may provide the pilot symbols to resources used for the dedicated pilot. The resources for data transmission and the resources for the dedicated pilot may be part of the resources allocated to the recipient UE for data transmission.

As shown in FIG. 2, the dedicated pilot may carry a signature of a downlink grant for the recipient UE. The recipient UE can obtain the transmission parameters from a downlink grant sent by the cell and can readily generate the PN sequence for the dedicated pilot. An interfered UE may demodulate the dedicated pilot by evaluating different hypotheses for the set of parameters sent in the dedicated pilot. For example, only the modulation order may be sent in the dedicated pilot, and only three modulation orders of QPSK, 16-QAM and 64-QAM may be supported by the system. The interfered UE may then demodulate the dedicated pilot for three hypotheses of QPSK, 16-QAM and 64-QAM and may obtain a demodulation metric for each hypothesis. The interfered UE may obtain a channel estimate as well as the modulation order of the data transmission based on the hypothesis with the best demodulation metric.

For symbol-level interference mitigation, it may be desirable for an interfered UE to be able to distinguish between modulation symbols of a desired transmission and modulation symbols of an interfering transmission. The wireless channel for a serving cell may often be different from the wireless channel for a neighbor cell. Hence, the interfered UE can typically distinguish between the modulation symbols of the desired and interfering transmissions after performing channel estimation. However, the distinction between the modulation symbols of the desired and interfering transmissions may be limited in certain cases, e.g., when the wireless channels for the serving cell and the neighbor cell are relatively close. Furthermore, uncertainty in channel knowledge (e.g., due to an unknown transmission parameter such as T2P) may lead to limited ability to distinguish between the modulation symbols of the desired and interfering transmissions, especially in the presence of noise.

In yet another aspect, scrambling may be performed at symbol level to enable an interfered UE to distinguish between modulation symbols of desired and interfering transmissions. A given cell may perform symbol-level scrambling by multiplying modulation symbols (or data symbols) of a data transmission to a served UE with a scrambling sequence of modulation symbols (or scrambling symbols). The scrambling sequence may be specific for the cell (e.g., generated based on a cell ID) and/or may be specific for the served UE (e.g., generated based on a UE ID). For other cell interference mitigation, it may be better to use cell-specific scrambling, so that the scrambling sequence may be known to interfered UEs in neighbor cells. In any case, the scrambling symbols can map the data symbols for the served UE to scrambled symbols that can be distinguished from the data symbols for an interfered UE. In one design, the scrambling symbols may be generated based on a modulation order/scheme that is different from the modulation orders available for data transmission. In another design, the scrambling symbols may be generated based on a modulation order that can map the data symbols for the served UE so that the scrambled symbols of the interfering transmission do not appear as valid scrambled symbols from the serving cell.

In one design, the scrambling symbols may be generated based on 8-PSK. This design may result in the scrambled symbols being rotated in quadrature as well as along diagonal axes. The scrambled symbols transmitted by the serving cell (e.g., with the data symbols being generated based on QPSK, 16-QAM, or 64-QAM) may then be readily distinguished from the scrambled symbols transmitted by the interfering cell. In contrast, if the scrambling symbols are generated based on QPSK and the data symbols are generated based on QPSK, 16-QAM, or 64-QAM, then the scrambled symbols from the serving and interfering transmissions may resemble each other. In general, the scrambled symbols should be defined by a signal constellation that does not resemble any signal constellation for data symbols.

Symbol-level scrambling for data transmission may improve robustness of interference mitigation. Symbol-level scrambling is different from scrambling on information bits provided to an encoder or code bits generated by the encoder. Symbol-level scrambling may allow the data symbols of the desired and interfering transmissions to be distinguished even if these transmissions undergo the same wireless channel.

Figure 3:
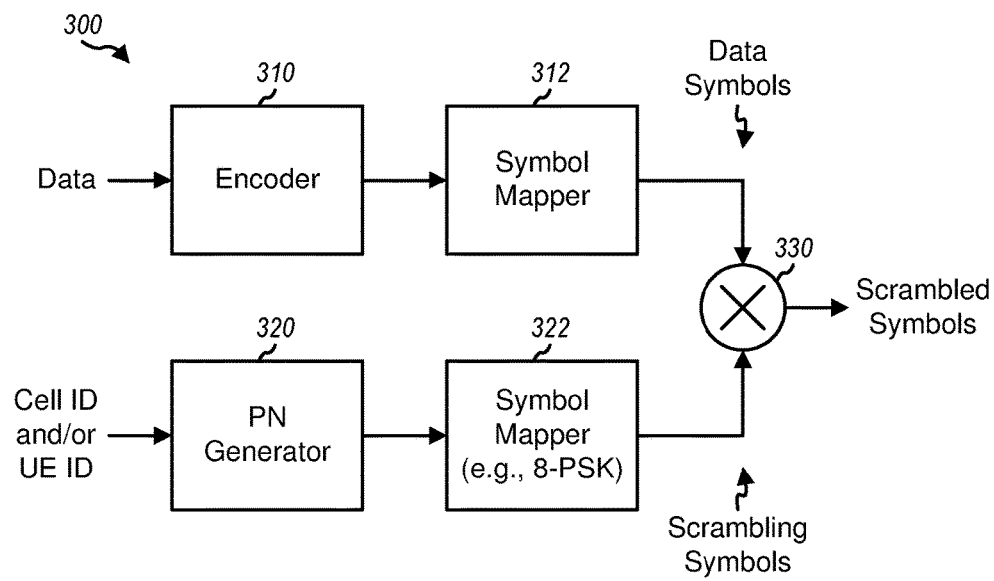
FIG. 3 shows a transmit processor that can perform symbol-level scrambling.

FIG. 3 shows a block diagram of a design of a transmit processor 300 that can perform symbol-level scrambling. Within transmit processor 300, an encoder 310 may receive data for a UE being served, encode the data based on a selected coding scheme or code rate, and provide coded data. A symbol mapper 312 may map the coded data to modulation symbols (or data symbols) based on a selected modulation order. A PN generator 320 may receive one or more scrambling parameters and may generate a PN sequence based on the scrambling parameter(s). The scrambling parameter(s) may include a cell ID for cell-specific scrambling, or a UE ID of the served UE for UE-specific scrambling, or some other parameter, or a combination thereof. A symbol mapper 322 may map the bits in the PN sequence to modulation symbols (or scrambling symbols) based on a modulation order (e.g., 8-PSK) used for the scrambling sequence. A multiplier 330 may receive the data symbols from symbol mapper 312 and the scrambling symbols from symbol mapper 322. Multiplier 330 may multiply each data symbol with a corresponding scrambling symbol to generate a corresponding scrambled symbol.

The received signal at UE 120, when symbol-level scrambling is performed by each cell, may be expressed as:

$$X(k)=H_1 \cdot S_1(k) \cdot Q_1(k)+H_2 \cdot S_2(k) \cdot Q_2(k)+N, \qquad \text{Eq (9)}$$

where $Q_1(k)$ is a scrambling sequence for the desired transmission, and $Q_2(k)$ is a scrambling sequence for the interfering transmission.

UE 120 may descramble the received signal based on the scrambling sequence for the desired transmission to obtain a descrambled signal, which may be expressed as:

$$Z(k)=X(k)\cdot Q_1^*(k)=H_1\cdot S_1(k)+H_2\cdot S_2(k)\cdot Q_2(k)\cdot Q_1^*(k)+N\cdot Q_1^*(k),\qquad \text{Eq (10)}$$

where $Z(k)$ is a descrambled signal for serving cell 110.

As shown in equation (10), the descrambled signal includes a desired transmission corresponding to $H_1\cdot S_1(k)$ as well as a scrambled interfering transmission corresponding to $H_2\cdot S_2(k)\cdot Q_2(k)\cdot Q_1^*(k)$. The desired transmission may comprise data symbols for a selected modulation order. The scrambled interfering transmission may comprise scrambled symbols, which may be rotated by a scrambling sequence $Q_2(k)\cdot Q_1^*(k)$ and may thus be distinguishable from the data symbols.

FIG. 4 shows a block diagram of a design of a receive processor 400 that can perform symbol-level descrambling. Receive processor 400 may be part of a UE. Within receive processor 400, a received signal comprising received symbols may be provided to a multiplier 412. A unit 414 may receive a scrambling sequence for a desired transmission and may provide a conjugated scrambling sequence as a descrambling sequence. Multiplier 412 may multiply each received symbol with a corresponding symbol in the descrambling sequence and provide a corresponding descrambled symbol. A demodulator 420 may perform demodulation with symbol-level interference mitigation based on channel estimates for the serving cell and one or more interfering cells as well as one or more transmission parameters such as modulation order, T2P, etc. Demodulator 420 may perform demodulation with soft-symbol interference cancellation as shown in equations (3) to (5) or may perform joint demodulation based on the criterion shown in equation (6). In either case, demodulator 420 may provide demodulated symbols for the serving cell. A decoder 430 may receive and decode the demodulated symbols and provide decoded data for UE 120.

UE 120 may perform demodulation and decoding for a desired transmission from serving cell 110 in various manners. In a first design, UE 120 may first perform demodulation and decoding without interference mitigation to recover data sent by serving cell 110. If decoding is unsuccessful, then UE 120 may next perform demodulation and decoding with interference mitigation to recover the data sent by serving cell 110. In a second design, UE 120 may perform demodulation and decoding with interference mitigation (and may not attempt to perform demodulation and decoding without interference mitigation) to recover the data sent by serving cell 110. In a third design, UE 120 may perform demodulation and decoding using either the first design or the second design based on one or more factors such as the channel quality for serving cell 110. For example, UE 120 may perform demodulation and decoding using the first design if the channel quality is sufficiently good and using the second design otherwise.

In another design, UE 120 may perform demodulation for the desired transmission by treating an interfering transmission as interference, e.g., as shown in equation (2), and may obtain a metric for this demodulation. UE 120 may also perform demodulation for the desired transmission with interference mitigation based on assumed transmission parameters for the interfering transmission and may obtain a metric for this demodulation. UE 120 may then select the demodulation output with the better metric.

UE 120 may perform demodulation and decoding with interference mitigation in various manners. In one design, UE 120 may estimate and cancel the interference from all interfering transmissions to obtain an interference-canceled signal and may then decode the interference-canceled signal to recover data sent by serving cell 110 to UE 120. In another design, UE 120 may estimate and cancel the interference from one interfering transmission at a time (e.g., starting with the strongest interfering transmission) and may decode the interference-canceled signal, after canceling the interference from each interfering transmission, to recover the data sent by serving cell 110 to UE 120. In yet another design, UE 120 may estimate and cancel the interference from one set of interfering transmissions at a time and may decode the interference-canceled signal after canceling the interference from each set of interfering transmissions. UE 120 may also perform demodulation and decoding with interference mitigation in other manners.

UE 120 may perform interference mitigation in various manners. In one design, UE 120 may perform interference mitigation for each interfering transmission based on known or assumed transmission parameters for that interfering transmission. In another design, UE 120 may perform blind demodulation for an interfering transmission based on different hypotheses for transmission parameters used for the interfering transmission. This design may be used if the transmission parameters (i) are not sent by any cell or (ii) are sent but not received by the interfered UE for any reason. The interfered UE may perform demodulation for the interfering transmission based on each hypothesis and may obtain a metric for the hypothesis. For example, the interfered UE may perform demodulation based on a hypothesis of QPSK, and another hypothesis of 16-QAM, and yet another hypothesis of 64-QAM. The interfered UE may then select the hypothesis with the best metric and may decode the demodulated symbols associated with the selected hypothesis.

For clarity, various techniques for interference mitigation have been described specifically for data transmission on the downlink. Some or all of these techniques may also be used for interference mitigation for data transmission on the uplink. A cell may perform interference mitigation as described above to mitigate interference due to interfering transmissions from UEs served by neighbor cells.

The techniques described herein may be used for interference mitigation for interfering transmissions from neighbor cells, which may be referred to as inter-cell interference mitigation. The techniques may also be used for intra-cell interference mitigation for multi-user MIMO (MU-MIMO). For MU-MIMO, multiple UEs may be scheduled for data transmission on the same time-frequency resources with spatial separation (e.g., via beamforming) at a cell. MU-MIMO is typically designed to be transparent to each UE being scheduled. Hence, a given UE may not be aware of other UE(s) being scheduled concurrently on the same time-frequency resources. The UE may have limited information about the other data transmission(s) sent by the cell to the other UE(s). For example, the UE may not know the presence of the other UE(s), the transmission rank, MCS, resources, etc. Interference mitigation for MU-MIMO (or intra-cell interference mitigation) may be performed in similar manner as inter-cell interference mitigation. The main differences between intra-cell interference mitigation and inter-cell interference mitigation may be as follows:

Inter-cell interference mitigation may require communication between cells to convey transmission parameters whereas intra-cell interference mitigation may be localized to a single cell and may not require inter-cell communication; and Any cell-specific aspect in the inter-cell context may be localized to a single cell in the intra-cell context. For example, cell ID in cell-specific scrambling (e.g., for UE-RS scrambling and/or data scrambling to differentiate between the serving and interfering cells) may be replaced with multiple cell IDs for the same cell and assigned (e.g., semi-statically or dynamically) to different UEs being scheduled concurrently for MU-MIMO.

A UE may perform interference mitigation for MU-MIMO in similar manner as an interfered UE performing interference mitigation for an interfering transmission from a neighbor cell. The UE may receive information for at least one transmission parameter for one or more other UEs scheduled concurrently with the UE for a MU-MIMO transmission. The UE may perform packet-level or symbol-level interference mitigation for each co-scheduled UE, as described above. The UE may also perform soft-symbol interference cancellation or joint demodulation for each co-scheduled UE, as also described above.

FIG. 5 shows a design of a process 500 for performing interference mitigation. Process 500 may be performed by a first UE for data transmission on the downlink (as described below), or by a base station for data transmission on the uplink, or by some other entity. The first UE may obtain a received signal comprising a first data transmission sent by a first cell to the first UE and a second data transmission sent by a second cell to a second UE (block 512). The first UE may also obtain information for at least one transmission parameter for the second data transmission (block 514). The first UE may perform interference mitigation for the second data transmission, based on the information for the at least one transmission parameter, to recover the first data transmission sent to the first UE (block 516).

In one design of block 516, the first UE may perform interference mitigation for the second data transmission at the packet level by (i) decoding the second data transmission to recover at least one packet sent by the second cell to the second UE, (ii) estimating interference due to the second data transmission based on the at least one packet, and (iii) canceling the estimated interference. In another design, the first UE may perform interference mitigation for the second data transmission at the symbol level, without decoding the second data transmission to recover any packet sent by the second cell to the second UE.

In one design of symbol-level interference mitigation, the first UE may perform soft-symbol interference cancellation. The first UE may first demodulate the received signal based on the information for the at least one transmission parameter to obtain demodulated symbols for the second data transmission. The first UE may then estimate interference due to the second data transmission based on the demodulated symbols for the second data transmission. The first UE may subtract the estimated interference from the received signal to obtain an interference-canceled signal. The first UE may then demodulate the interference-canceled signal to obtain demodulated symbols for the first data transmission.

In another design of symbol-level interference mitigation, the first UE may perform joint demodulation on the received signal based on the information for the at least one transmission parameter to obtain demodulated symbols for both the first and second data transmissions. The first UE may discard the demodulated symbols for the second data transmission and may process (e.g., decode) the demodulated symbols for the first data transmission.

In yet another design of symbol-level interference mitigation, the first UE may perform iterative demodulation and decoding. The first UE may perform demodulation with interference mitigation and decoding for a plurality of iterations. The output of demodulation in each iteration may be used for decoding in the same iteration. The output of decoding in each iteration, except for the final iteration, may be used for demodulation in the next iteration.

In one design, the first UE may perform demodulation with interference mitigation for a plurality of hypotheses. Each hypothesis may correspond to a different set of one or more values for one or more transmission parameters. The first UE may select the demodulation output for the hypothesis with the best metric. In another design, the first UE may perform demodulation with interference mitigation for a single hypothesis, e.g., based on known or assumed value for the at least one transmission parameter.

In one design, the first UE may obtain a channel estimate for a wireless channel from the second cell to the first UE based on information for one or more transmission parameters, e.g., T2P, precoding information, transmission rank, etc. This design may be used if the second cell transmits a common pilot (or a cell-specific reference signal) for all UEs served by the second cell. This design may also be used if the second cell transmits a dedicated pilot (or a UE-specific reference signal) to the second UE. In any case, the first UE may perform demodulation with interference mitigation based on the channel estimate to obtain demodulated symbols for the first data transmission.

In one design, the first UE may obtain the information for the at least one transmission parameter from signaling transmitted by the first cell or the second cell. In another design, the first UE may obtain the information for the at least one transmission parameter from a pilot (e.g., a dedicated pilot) transmitted by the second cell to the second UE. The first UE may also obtain the information for the at least one transmission parameter in other manners. The information for the at least one transmission parameter may comprise a modulation order, or an MCS, or a T2P, or precoding information (e.g., PMI, transmission mode indicator, etc.), or a transmission rank, or assigned resources for the second data transmission, or some other information, or a combination thereof. In one design, the first UE may obtain actual value of the at least one transmission parameter used by the second cell for the second data transmission. In another design, the first UE may obtain default value of the at least one transmission parameter likely to be used by the second cell for the second data transmission.

FIG. 6 shows a design of an apparatus 600 for performing interference mitigation. Apparatus 600 includes a module 612 to obtain at a first UE a received signal comprising a first data transmission sent by a first cell to the first UE and a second data transmission sent by a second cell to a second UE, a module 614 to obtain information for at least one transmission parameter for the second data transmission, and a module 616 to perform interference mitigation for the second data transmission, based on the information for the at least one transmission parameter, to recover the first data transmission sent to the first UE.

FIG. 7 shows a design of a process 700 for sending transmission parameters to support interference mitigation. Process 700 may be performed by a cell (as described below) or by some other entity. Information for at least one transmission parameter for a data transmission sent by a first cell to a UE may be obtained (block 712). The information for the at least one transmission parameter may be transmitted to at least one UE served by a second cell to enable the at least one UE to perform interference mitigation for the data transmission sent by the first cell to the UE (block 714).

In one design, blocks 712 and 714 may be performed by the first cell. In another design, blocks 712 and 714 may be performed by the second cell, which may receive the information for the at least one transmission parameter from the first cell via the backhaul. In any case, the information for the at least one transmission parameter may comprise a modulation order, or an MCS, or a T2P, or precoding information, or a transmission rank, or assigned resources for the data transmission, or some other information, or a combination thereof.

In one design, information for transmission parameters for UEs or cells that are potential interferers may be sent to other UEs for interference mitigation. The UE or the first cell may be identified as potential interferer to the at least one UE based on pilot measurement from the UE, or the location of the UE, or pilot measurements from the at least one UE, or the location of the at least one UE, or some other information, or a combination thereof.

FIG. 8 shows a design of an apparatus 800 for sending transmission parameters to support interference mitigation. Apparatus 800 includes a module 812 to obtain information for at least one transmission parameter for a data transmission sent by a first cell to a UE, and a module 814 to transmit the information for the at least one transmission parameter to at least one UE served by a second cell to enable the at least one UE to perform interference mitigation for the data transmission sent by the first cell to the UE.

FIG. 9 shows a design of a process 900 for sending transmission parameters via a pilot. Process 900 may be performed by a cell (as described below) or by some other entity. The cell may generate a data transmission based on at least one transmission parameter (block 912). The cell may also generate a pilot (e.g., a dedicated pilot) comprising information for the at least one transmission parameter, which may include any of the information listed above (block 914). In one design, the cell may generate a PN sequence based on the information for the at least one transmission parameter and may then generate modulation symbols for the pilot based on the PN sequence. The cell may transmit the pilot and the data transmission to a recipient UE (block 916). Other UEs may use the information for the at least one transmission parameter in the pilot to perform interference mitigation for the data transmission.

FIG. 10 shows a design of an apparatus 1000 for sending transmission parameters via a pilot. Apparatus 1000 includes a module 1012 to generate a data transmission based on at least one transmission parameter, a module 1014 to generate a pilot comprising information for the at least one transmission parameter, and a module 1016 to transmit the pilot and the data transmission.

Figure 11:
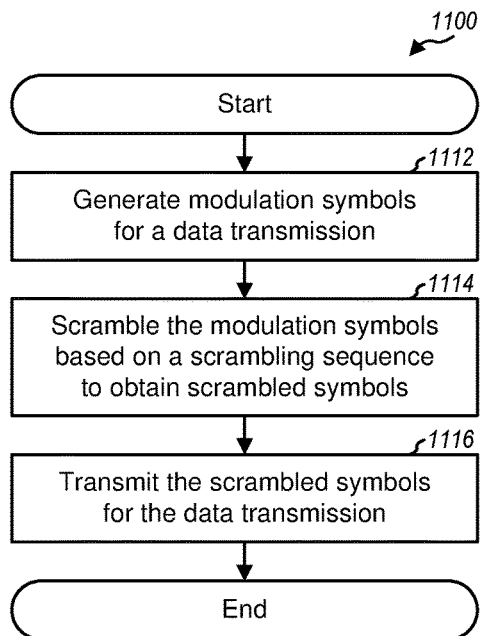
FIGS. 11 and 12 show a process and an apparatus, respectively, for performing symbol level scrambling.

FIG. 11 shows a design of a process 1100 for performing symbol level scrambling. Process 1100 may be performed by a cell (as described below) or by some other entity. The cell may generate modulation symbols for a data transmission (block 1112). The cell may scramble the modulation symbols based on a scrambling sequence to obtain scrambled symbols (block 1114). The cell may transmit the scrambled symbols for the data transmission (block 1116).

In one design, the cell may generate the scrambling sequence based on a cell ID, or a UE ID, or both. In one design, the cell may generate the scrambling sequence based on (i) a modulation order that is not used for the data transmission, or (ii) a modulation order that does not map the modulation symbols for the data transmission to other valid modulation symbols, or (iii) 8-PSK or some other suitable modulation order.

Figure 12:
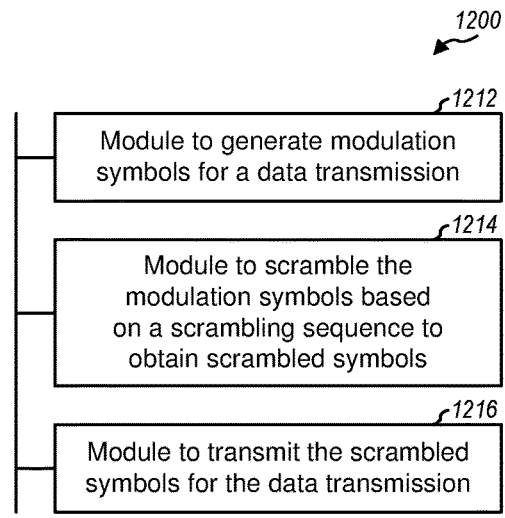

FIG. 12 shows a design of an apparatus 1200 for performing symbol level scrambling. Apparatus 1200 includes a module 1212 to generate modulation symbols for a data transmission, a module 1214 to scramble the modulation symbols based on a scrambling sequence to obtain scrambled symbols, and a module 1216 to transmit the scrambled symbols for the data transmission.

Figure 13:
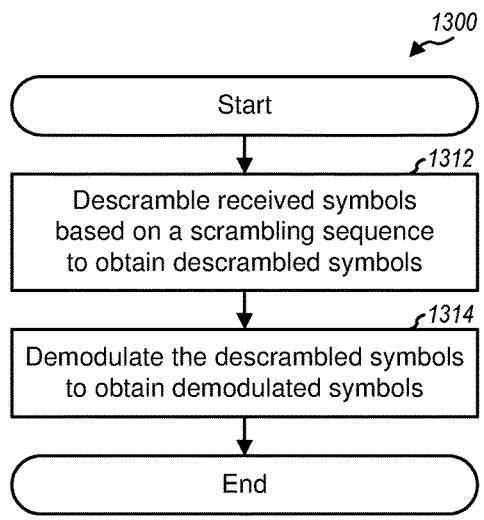
FIGS. 13 and 14 show a process and an apparatus, respectively, for performing symbol level descrambling.

FIG. 13 shows a design of a process 1300 for performing symbol level descrambling. Process 1300 may be performed by a UE (as described below) or by some other entity. The UE may descramble received symbols based on a scrambling sequence to obtain descrambled symbols (block 1312). In one design, the UE may generate the scrambling sequence based on a cell ID, or a UE ID, or both. The UE may demodulate the descrambled symbols to obtain demodulated symbols (block 1314).

In one design, the UE may obtain the received symbols comprising a first data transmission sent by a first cell to the UE and a second data transmission sent by a second cell to a second UE. The UE may also obtain information for at least one transmission parameter for the second data transmission. The UE may demodulate the descrambled symbols with interference mitigation based on the information for at least one transmission parameter to recover the first data transmission sent to the UE.

Figure 14:
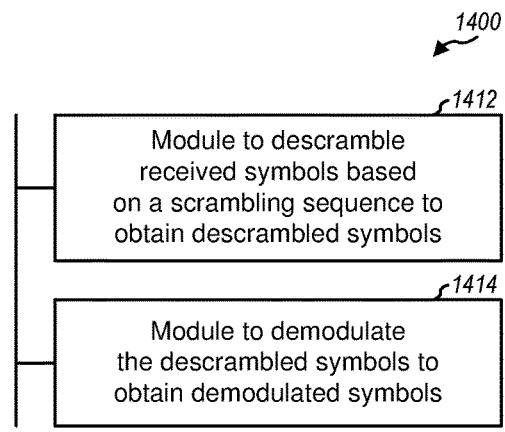

FIG. 14 shows a design of an apparatus 1400 for performing symbol level descrambling. Apparatus 1400 includes a module 1412 to descramble received symbols based on a scrambling sequence to obtain descrambled symbols, and a module 1414 to demodulate the descrambled symbols (e.g., with interference mitigation) to obtain demodulated symbols.

The modules in FIGS. 6, 8, 10, 12 and 14 may comprise processors, electronic devices, hardware devices, electronic components, logical circuits, memories, software codes, firmware codes, etc., or any combination thereof.

Figure 15:
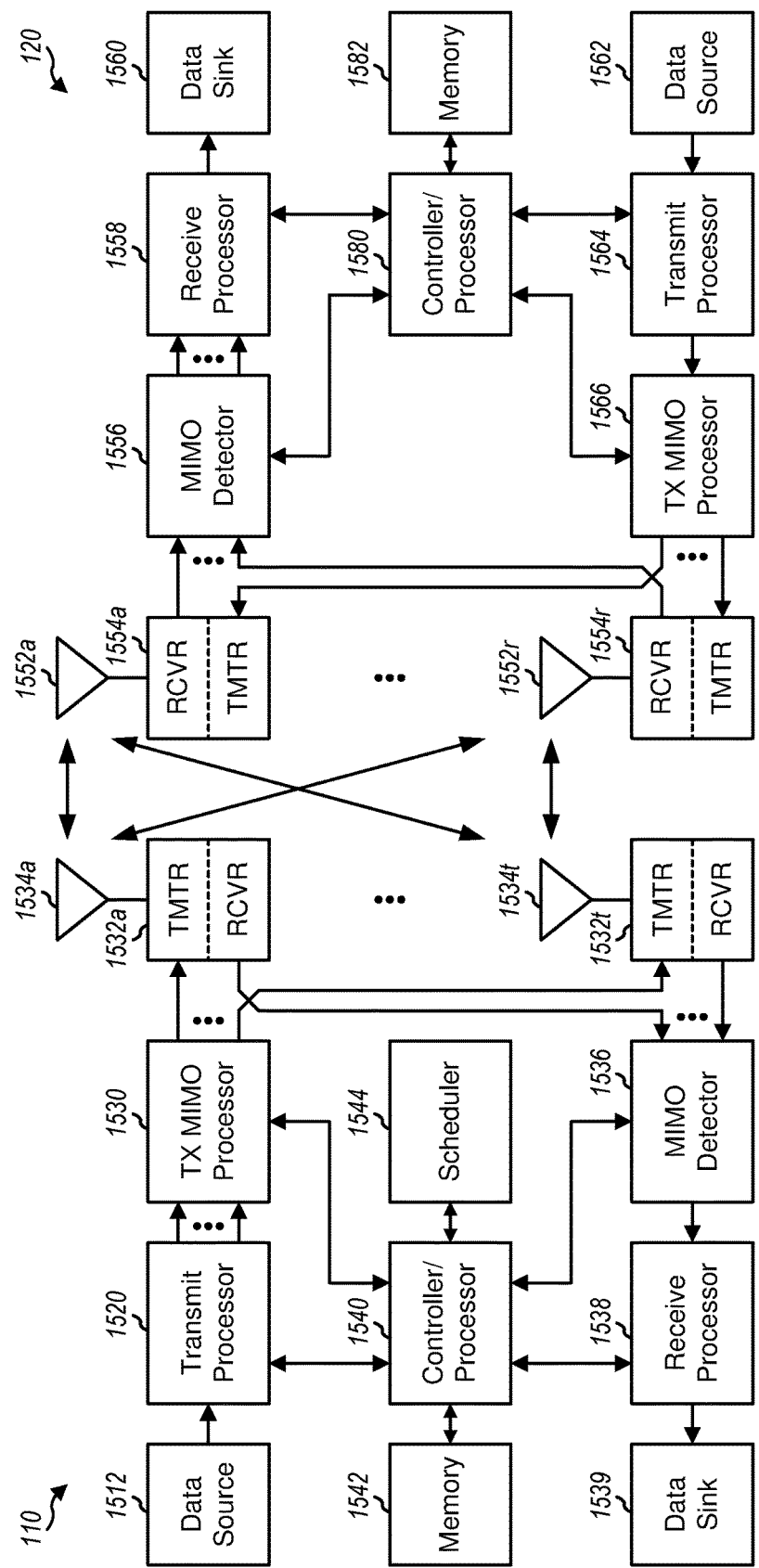
FIG. 15 shows a block diagram of a base station and a UE.

FIG. 15 shows a block diagram of a design of base station 110 and UE 120 in FIG. 1. Base station 110 may be equipped with T antennas 1534a through 1534t, and UE 120 may be equipped with R antennas 1552a through 1552r, where in general T≥1 and R≥1.

At base station 110, a transmit processor 1520 may receive data from a data source 1512 for one or more UEs, process (e.g., encode and modulate) the data for each UE based on one or more MCSs selected for that UE, and provide data symbols for all UEs. Transmit processor 1520 may also receive control information (e.g., grants, transmission parameters for UEs communicating with neighbor cells, etc.) from a controller/processor 1540. Processor 1520 may process the control information and provide control symbols. Processor 1520 may also generate pilot/reference symbols for one or more pilots/reference signals, e.g., dedicated pilot, common pilot, etc. A transmit (TX) MIMO processor 1530 may perform spatial processing (e.g., precoding) on the data symbols, the control symbols, and/or the pilot symbols, if applicable, and may provide T output symbol streams to T transmitters (TMTRs) 1532a through 1532t. Each transmitter 1532 may process a respective output symbol stream (e.g., for OFDM, etc.) to obtain an output sample stream. Each transmitter 1532 may further process (e.g., convert to analog, amplify, filter, and upconvert) the output sample stream to obtain a downlink signal. T downlink signals from transmitters 1532a through 1532t may be transmitted via T antennas 1534a through 1534t, respectively.

At UE 120, antennas 1552a through 1552r may receive the downlink signals from base station 110 and may provide received signals to receivers (RCVRs) 1554*a* through 1554*r*, respectively. Each receiver 1554 may condition (e.g., filter, amplify, downconvert, and digitize) its received signal to obtain input samples. Each receiver 1554 may further process the input samples (e.g., for OFDM, etc.) to obtain received symbols. A MIMO detector 1556 may obtain received symbols from all R receivers 1554*a* through 1554*r*, perform MIMO detection on the received symbols if applicable, and provide detected symbols. A receive processor 1558 may process (e.g., demodulate with interference mitigation and decode) the detected symbols, provide decoded data for UE 120 to a data sink 1560, and provide decoded control information to a controller/processor 1580.

On the uplink, at UE 120, a transmit processor 1564 may receive and process data from a data source 1562 and control information from controller/processor 1580. Processor 1564 may also generate pilot/reference symbols for pilot/reference signal. The symbols from transmit processor 1564 may be precoded by a TX MIMO processor 1566 if applicable, further processed by transmitters 1554*a* through 1554*r* (e.g., for SC-FDM, OFDM, etc.), and transmitted to base station 110. At base station 110, the uplink signals from UE 120 may be received by antennas 1534, processed by receivers 1532, detected by a MIMO detector 1536 if applicable, and further processed by a receive processor 1538 to obtain decoded data and control information sent by UE 120. Processor 1538 may provide the decoded data to a data sink 1539 and the decoded control information to controller/processor 1540.

Transmit processors 1520 and 1564 may each implement transmit processor 200 in FIG. 2, transmit processor 300 in FIG. 3, and/or other transmit processor designs. Receive processors 1538 and 1558 may each implement receive processor 400 in FIG. 4 and/or other receive processor designs.

Controllers/processors 1540 and 1580 may direct the operation at base station 110 and UE 120, respectively. Processor 1540 and/or other processors and modules at base station 110 may perform or direct process 700 in FIG. 7, process 900 in FIG. 9, process 1100 in FIG. 11, and/or other processes for the techniques described herein. Processor 1580 and/or other processors and modules at UE 120 may perform or direct process 500 in FIG. 5, process 1300 in FIG. 13, and/or other processes for the techniques described herein. Memories 1542 and 1582 may store data and program codes for base station 110 and UE 120, respectively. A scheduler 1544 may schedule UEs for data transmission on the downlink and/or uplink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, wherein the method is performed at a first user equipment, the method comprising:
obtaining at the first user equipment a received signal comprising a first data transmission sent by a first cell to the first user equipment and a second data transmission sent by a second cell to a second user equipment;
obtaining, from the second data transmission sent by the second cell, information for at least one transmission parameter for the second data transmission; and
performing symbol-level interference mitigation for the second data transmission, based on the information for the at least one transmission parameter, to recover the first data transmission sent to the first user equipment,
wherein the performing symbol-level interference mitigation comprises:
demodulating symbols for the second data transmission without decoding the second data transmission to recover any packet sent by the second cell to the second user equipment,
demodulating the received signal based on the information for the at least one transmission parameter to obtain demodulated symbols for the second data transmission,
estimating interference due to the second data transmission based on the demodulated symbols for the second data transmission,
subtracting the estimated interference from the received signal to obtain an interference-canceled signal, and
demodulating the interference-canceled signal to obtain demodulated symbols for the first data transmission.

2. The method of claim 1, wherein the performing symbol-level interference mitigation further comprises performing joint demodulation on the received signal based on the information for the at least one transmission parameter to obtain demodulated symbols for the first and second data transmissions.

3. The method of claim 1, wherein the performing symbol-level interference mitigation further comprises performing demodulation with symbol-level interference mitigation for a plurality of hypotheses, each hypothesis corresponding to a different set of one or more values for one or more of the at least one transmission parameter.

4. The method of claim 1, wherein the performing symbol-level interference mitigation further comprises
obtaining a channel estimate for a wireless channel from the second cell to the first user equipment based on information for one or more of the at least one transmission parameter, and
performing demodulation with symbol-level interference mitigation based further on the channel estimate to obtain the demodulated symbols for the first data transmission.

5. The method of claim 1, wherein the information for the at least one transmission parameter comprises at least one of:
a modulation order,
a modulation and coding scheme,
a traffic-to-pilot ratio,
precoding information,
a transmission rank, or
assigned resources for the second data transmission.

6. The method of claim 1, wherein the obtaining the information for the at least one transmission parameter comprises obtaining actual value of the at least one transmission parameter used by the second cell for the second data transmission.

7. The method of claim 1, wherein the obtaining the information for the at least one transmission parameter comprises obtaining a default value of the at least one transmission parameter likely to be used by the second cell for the second data transmission.

8. The method of claim 1, wherein the obtaining the information for the at least one transmission parameter comprises obtaining the information for the at least one transmission parameter from a pilot transmitted by the second cell to the second user equipment.

9. The method of claim 1, wherein the symbol-level interference mitigation is based in part on a scrambling sequence.

10. A first user equipment for wireless communication, comprising:
means for obtaining at the first user equipment a received signal comprising a first data transmission sent by a first cell to the first user equipment and a second data transmission sent by a second cell to a second user equipment;
means for obtaining, from the second data transmission sent by the second cell, information for at least one transmission parameter for the second data transmission; and
means for performing symbol-level interference mitigation for the second data transmission, based on the information for the at least one transmission parameter, to recover the first data transmission sent to the first user equipment, wherein the means for performing symbol-level interference mitigation comprises:
means for demodulating symbols for the second data transmission without decoding the second data transmission to recover any packet sent by the second cell to the second user equipment,
means for demodulating the received signal based on the information for the at least one transmission parameter to obtain demodulated symbols for the second data transmission,
means for estimating interference due to the second data transmission based on the demodulated symbols for the second data transmission,
means for subtracting the estimated interference from the received signal to obtain an interference-canceled signal, and
means for demodulating the interference-canceled signal to obtain demodulated symbols for the first data transmission.

11. The first user equipment of claim 10, wherein the means for performing symbol-level interference mitigation further comprises means for performing joint demodulation on the received signal based on the information for the at least one transmission parameter to obtain demodulated symbols for the first and second data transmissions.

12. The first user equipment for wireless communication of claim 10, wherein the symbol-level interference mitigation is based in part on a scrambling sequence.

13. A method for wireless communication, comprising:
obtaining information for at least one transmission parameter for a first data transmission sent by a first cell to a user equipment; and
transmitting, from the first cell, the information for the at least one transmission parameter to at least one user equipment served by a second cell to enable the at least one user equipment to perform symbol-level interference mitigation for the first data transmission sent by the first cell to the user equipment based on the at least one transmission parameter,
wherein the symbol-level interference mitigation comprises:
demodulating symbols in the first data transmission from the first cell without decoding the first data transmission from the first cell to recover any packet sent by the first cell to the user equipment,
demodulating a signal received from the second cell based on the information for the at least one transmission parameter to obtain demodulated symbols for the first data transmission,
estimating interference due to the first data transmission based on the demodulated symbols for the first data transmission,
subtracting the estimated interference from the received signal to obtain an interference-canceled signal, and
demodulating the interference-canceled signal to obtain demodulated symbols for a second data transmission from the second cell.

14. The method of claim 13, wherein the information for the at least one transmission parameter comprises at least one of:
a modulation order,
a modulation and coding scheme,
a traffic-to-pilot ratio,
precoding information,
a transmission rank, or
assigned resources for the first data transmission.

15. The method of claim 13, wherein the obtaining the information is performed by the first cell.

16. The method of claim 13, further comprising:
identifying the user equipment or the first cell as potential interferer to the at least one user equipment based on at least one of:
pilot measurement from the user equipment,
location of the user equipment,
pilot measurements from the at least one user equipment, or
location of the at least one user equipment.

17. An apparatus for wireless communication, comprising:
means for obtaining information for at least one transmission parameter for a first data transmission sent by a first cell to a user equipment; and
means for transmitting, from the first cell, the information for the at least one transmission parameter to at least one user equipment served by a second cell to enable the at least one user equipment to perform symbol-level interference mitigation for the first data transmission sent by the first cell to the user equipment based on the at least one transmission parameter,
wherein the symbol-level interference mitigation comprises:
demodulating symbols in the first data transmission from the first cell without decoding the first data transmission from the first cell to recover any packet sent by the first cell to the user equipment,
demodulating a signal received from the second cell based on the information for the at least one transmission parameter to obtain demodulated symbols for the first data transmission,
estimating interference due to the first data transmission based on the demodulated symbols for the first data transmission,
subtracting the estimated interference from the received signal to obtain an interference-canceled signal, and
demodulating the interference-canceled signal to obtain demodulated symbols for a second data transmission from the second cell.

18. The apparatus of claim 17, wherein the information for the at least one transmission parameter comprises at least one of:
a modulation order,
a modulation and coding scheme,
a traffic-to-pilot ratio,
precoding information,
a transmission rank, or
assigned resources for the first data transmission.

19. A first user equipment, comprising at least one processor configured to:
obtain a received signal comprising a first data transmission sent by a first cell to the first user equipment and a second data transmission sent by a second cell to a second user equipment;
obtain, from the second data transmission sent by the second cell, information for at least one transmission parameter for the second data transmission; and
perform symbol-level interference mitigation for the second data transmission, based on the information for the at least one transmission parameter, to recover the first data transmission sent to the first user equipment,
wherein performing symbol-level interference mitigation comprises:
demodulating symbols for the second data transmission without decoding the second data transmission to recover any packet sent by the second cell to the second user equipment,
demodulate the received signal based on the information for the at least one transmission parameter to obtain demodulated symbols for the second data transmission,
estimate interference due to the second data transmission based on the demodulated symbols for the second data transmission,
subtract the estimated interference from the received signal to obtain an interference-canceled signal, and
demodulate the interference-canceled signal to obtain demodulated symbols for the first data transmission.

20. The first user equipment of claim 19, wherein the symbol-level interference mitigation is based in part on a scrambling sequence.

21. A non-transitory computer-readable medium comprising:
code for causing a first user equipment to obtain a received signal comprising a first data transmission sent by a first cell to the first user equipment and a second data transmission sent by a second cell to a second user equipment;

code for causing the first user equipment to obtain, from the second data transmission sent by the second cell, information for at least one transmission parameter for the second data transmission; and code for causing the first user equipment to obtain perform symbol-level interference mitigation for the second data transmission, based on the information for the at least one transmission parameter, to recover the first data transmission sent to the first user equipment, wherein the code for causing the first user equipment to perform symbol-level interference mitigation comprises code for causing the first user equipment to:

demodulate symbols for the second data transmission without decoding the second data transmission to recover any packet sent by the second cell to the second user equipment, demodulate the received signal based on the information for the at least one transmission parameter to obtain demodulated symbols for the second data transmission, estimate interference due to the second data transmission based on the demodulated symbols for the second data transmission, subtract the estimated interference from the received signal to obtain an interference-canceled signal, and demodulate the interference-canceled signal to obtain demodulated symbols for the first data transmission.

22. A first cell, comprising at least one processor configured to:

obtain information for at least one transmission parameter for a first data transmission sent by the first cell to a user equipment; and transmit, from the first cell, the information for the at least one transmission parameter to at least one user equipment served by a second cell to enable the at least one user equipment to perform symbol-level interference mitigation for the first data transmission sent by the first cell to the user equipment based on the at least one transmission parameter, wherein the symbol-level interference mitigation comprises:

demodulating symbols in the first data transmission from the first cell without decoding the first data transmission from the first cell to recover any packet sent by the first cell to the user equipment, demodulating a signal received from the second cell based on the information for the at least one transmission parameter to obtain demodulated symbols for the first data transmission, estimating interference due to the first data transmission based on the demodulated symbols for the first data transmission, subtracting the estimated interference from the received signal to obtain an interference-canceled signal, and demodulating the interference-canceled signal to obtain demodulated symbols for a second data transmission from the second cell.

23. A non-transitory computer-readable medium comprising:

code for causing a first cell to obtaining information for at least one transmission parameter for a first data transmission sent by the first cell to a user equipment; and code for causing the first cell to transmit the information for the at least one transmission parameter to at least one user equipment served by a second cell to enable the at least one user equipment to perform symbol-level interference mitigation for the first data transmission sent by the first cell to the user equipment based on the at least one transmission parameter, wherein the symbol-level interference mitigation comprises:

demodulating symbols in the first data transmission from the first cell without decoding the first data transmission from the first cell to recover any packet sent by the first cell to the user equipment, demodulating a signal received from the second cell based on the information for the at least one transmission parameter to obtain demodulated symbols for the first data transmission, estimating interference due to the first data transmission based on the demodulated symbols for the first data transmission, subtracting the estimated interference from the received signal to obtain an interference-canceled signal, and demodulating the interference-canceled signal to obtain demodulated symbols for a second data transmission from the second cell.

* * * * *